(12) United States Patent
Janz

(10) Patent No.: US 6,778,347 B2
(45) Date of Patent: Aug. 17, 2004

(54) LOAD BALANCING CIRCUIT FOR A DUAL POLARITY POWER SUPPLY WITH SINGLE POLARITY VOLTAGE REGULATION

(75) Inventor: Donald W. Janz, Oklahoma City, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 349 days.

(21) Appl. No.: 09/904,721

(22) Filed: Jul. 13, 2001

(65) Prior Publication Data

US 2002/0060875 A1 May 23, 2002

Related U.S. Application Data

(60) Provisional application No. 60/249,960, filed on Nov. 20, 2000.

(51) Int. Cl.$^7$ .............................. G11B 5/02; G11B 5/596
(52) U.S. Cl. ......................... 360/69; 360/75; 360/266.3; 360/77.2
(58) Field of Search ............................... 360/55, 77.02, 360/67, 69, 46, 65, 66, 68, 62, 264.7, 266.4, 266.3, 60, 75

(56) References Cited

U.S. PATENT DOCUMENTS

| | | | | |
|---|---|---|---|---|
| 3,577,194 | A | * 5/1971 | Beall | ........................... 341/165 |
| 3,657,634 | A | 4/1972 | Eastop | |
| 3,697,862 | A | * 10/1972 | Taylor | ......................... 323/268 |
| 3,708,742 | A | 1/1973 | Gunn | |
| 3,772,582 | A | 11/1973 | Martin | |
| 3,860,864 | A | 1/1975 | Fitz | |
| 4,028,559 | A | 6/1977 | Larner | |
| 4,030,022 | A | 6/1977 | Bird | |
| 4,093,980 | A | 6/1978 | Gurwicz | |
| 4,164,014 | A | 8/1979 | Crowe et al. | |
| 4,207,475 | A | 6/1980 | Nercessian | |
| 4,225,913 | A | 9/1980 | Bray | |
| 4,274,132 | A | 6/1981 | Molyneux-Berry | |
| 4,389,702 | A | 6/1983 | Clemente et al. | |
| 4,395,647 | A | 7/1983 | Morong, III | |
| 4,502,152 | A | 2/1985 | Sinclair | |
| 4,535,410 | A | 8/1985 | O'Mara | |
| 4,626,697 | A | 12/1986 | Nelson | |
| 4,636,930 | A | 1/1987 | Bingham et al. | |

(List continued on next page.)

FOREIGN PATENT DOCUMENTS

| | | |
|---|---|---|
| EP | 0 257 810 A2 | 3/1988 |
| EP | 0 489 412 A2 | 6/1992 |
| WO | WO 95/17036 A1 | 6/1995 |

OTHER PUBLICATIONS

Data Sheet for Switched–Capacitor Voltage Converter With Regulator; LT1054; Texas Instruments Data Book; Aug., 1991; Dallas, Texas.

*Primary Examiner*—David Hudspeth
*Assistant Examiner*—Natalia Figueroa
(74) *Attorney, Agent, or Firm*—Fellers, Snider, et al.

(57) ABSTRACT

A load balancing circuit which operates to balance the output voltages of a dual polarity power supply with single polarity voltage regulation. The power supply outputs a positive voltage at a positive voltage with respect to a reference level and a negative voltage with respect to the reference level. The power supply further applies voltage regulation to a selected one of the positive and negative voltages and leaves the remaining one of the positive and negative voltages in an unregulated state. Positive and negative loads are coupled to receive the positive and negative voltages. The load balancing circuit detects a change in impedance of a selected one of the positive and negative loads and applies a corresponding impedance to the power supply to maintain the power supply in a nominally balanced state.

17 Claims, 3 Drawing Sheets

U.S. PATENT DOCUMENTS

| | | | | |
|---|---|---|---|---|
| 4,679,134 A | | 7/1987 | Bingham et al. | |
| 4,686,615 A | | 8/1987 | Ferguson | |
| 4,740,878 A | | 4/1988 | Carter et al. | |
| 4,777,577 A | | 10/1988 | Bingham et al. | |
| 4,797,899 A | | 1/1989 | Fuller et al. | |
| 4,807,104 A | | 2/1989 | Floyd et al. | |
| 4,809,152 A | | 2/1989 | Bingham et al. | |
| 4,835,669 A | | 5/1989 | Hancock et al. | |
| 4,885,517 A | * | 12/1989 | Pennock | 318/678 |
| 4,888,677 A | | 12/1989 | Grimm et al. | |
| 4,897,774 A | | 1/1990 | Bingham et al. | |
| 4,942,509 A | | 7/1990 | Shires et al. | |
| 4,942,510 A | | 7/1990 | Edwards | |
| 4,985,662 A | | 1/1991 | Willcocks et al. | |
| 4,999,761 A | | 3/1991 | Bingham et al. | |
| 5,008,799 A | | 4/1991 | Montalvo | |
| 5,051,882 A | | 9/1991 | Grimm et al. | |
| 5,095,223 A | | 3/1992 | Thomas | |
| 5,146,397 A | * | 9/1992 | Fruhling | 363/74 |
| 5,159,543 A | | 10/1992 | Yamawaki | |
| 5,166,538 A | | 11/1992 | Norton | |
| 5,179,535 A | | 1/1993 | Nakayama | |
| 5,218,235 A | | 6/1993 | Patterson et al. | |
| 5,224,130 A | | 6/1993 | Mayo et al. | |
| 5,237,464 A | * | 8/1993 | Cronch et al. | 360/46 |
| 5,241,430 A | * | 8/1993 | Janz | 360/62 |
| 5,606,491 A | | 2/1997 | Ellis | |
| 5,623,222 A | | 4/1997 | Tamagawa | |
| 5,668,710 A | | 9/1997 | Caliboso et al. | |
| 5,675,239 A | * | 10/1997 | Kim et al. | 323/273 |
| 5,712,777 A | | 1/1998 | Nicollini et al. | |
| 5,764,501 A | | 6/1998 | Limpaecher | |
| 5,828,560 A | | 10/1998 | Alderman | |
| 5,831,782 A | * | 11/1998 | Kohno et al. | 360/66 |
| 5,914,632 A | | 6/1999 | Fotouhi et al. | |
| 6,125,047 A | * | 9/2000 | Janz | 363/60 |
| 6,166,923 A | | 12/2000 | Rehm et al. | |
| 6,178,055 B1 | | 1/2001 | Janz | |
| 6,198,325 B1 | | 3/2001 | Ang et al. | |
| 6,215,342 B1 | | 4/2001 | Morrill | |
| 6,233,163 B1 | | 5/2001 | Lin et al. | |
| 6,541,931 B2 | * | 4/2003 | Ho et al. | 318/560 |

* cited by examiner

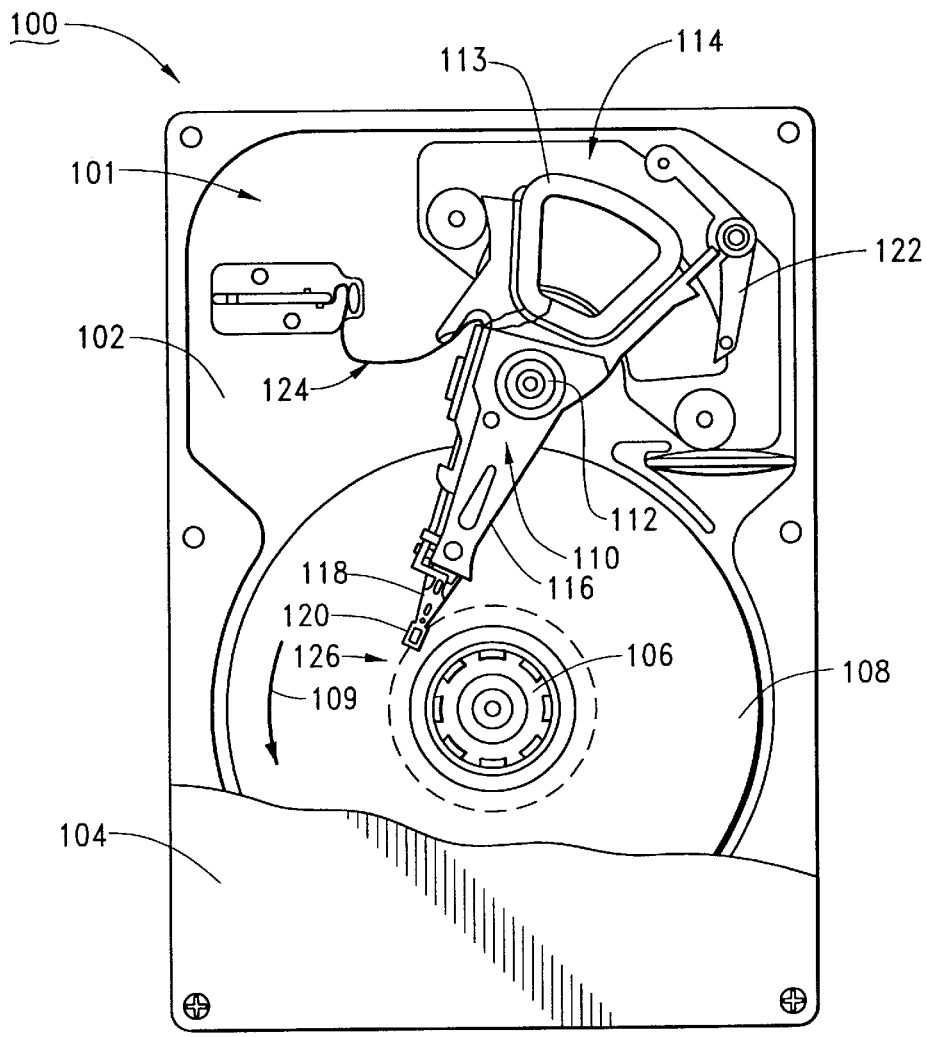
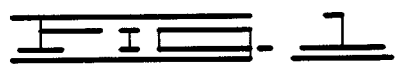
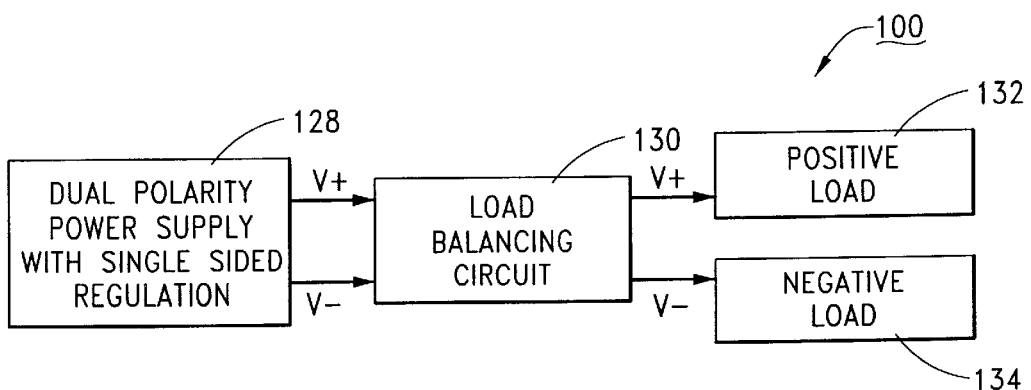
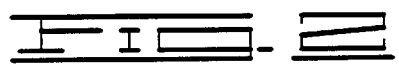

LOAD BALANCING CIRCUIT FOR A DUAL POLARITY POWER SUPPLY WITH SINGLE POLARITY VOLTAGE REGULATION

RELATED APPLICATIONS

This application claims priority to Provisional Application No. 60/249,960 filed Nov. 20, 2000.

FIELD OF THE INVENTION

The claimed invention relates generally to the field of electrical circuits and more particularly, but not by way of limitation, to a load balancing circuit used to balance output voltages from a dual polarity power supply with single polarity voltage regulation.

BACKGROUND

Electrical circuits require source voltages at appropriate potentials with respect to a reference level (such as ground). Such is the case for the electrical circuits of a disc drive, which is a digital data storage device that enables a user of a computer system to store and retrieve digital data in a fast and efficient manner.

A typical disc drive requires a variety of operational voltage input levels, such as positive five and twelve volts (+5 and +12V) and negative five volts (−5V). These voltages are externally supplied to the disc drive by a computer power supply. A typical disc drive further has one or more internal power supplies that generate various voltage levels used by the disc drive during operation. For example, small motors (microactuators) used to provide fine positioning of disc drive recording heads adjacent disc recording surfaces can require the application of relatively large source voltages, such as ±40 volts.

A dual polarity power supply provides one output voltage having a positive potential with respect to a reference level and another output voltage having a negative potential with respect to the reference level. The output voltages may or may not be mirrored about the reference level (i.e., the output voltages might be ±15V, or the output voltages might be +20V and −10V). Voltage regulation circuitry provides a feedback control loop to adjust the operational characteristics of the power supply to maintain the output voltages at nominal levels.

A dual polarity power supply can have single polarity (single sided) regulation or dual sided regulation. Dual sided regulation involves providing separate regulation circuits for each output voltage. The regulators work independently to maintain the respective output voltages at the desired output levels. Single sided regulation involves providing a regulation circuit on just one of the output voltages. The output voltages are configured to operate in a lead-follow fashion so that unregulated output voltage will tend to follow adjustments made to the regulated output voltage.

While dual sided regulation generally provides better voltage regulation performance, dual sided regulation supplies are also more expensive and complex to implement. In the cost sensitive environment of disc drives, manufacturers often attempt to implement dual polarity power supplies with single sided regulation and rely on the ability of the single regulator to maintain both polarities of output voltage at near nominal operating levels.

Single sided regulation has been found to provide adequate performance as long as the respective positive and negative loads supplied by the power supply remain within a certain amount of relative balance. However, when large changes occur in the amount of impedance presented by one of the loads, the single regulator may not be able to maintain both output voltages at desired operational levels and voltage drift may result. Regulation of the positive voltage with a lower impedance load on the positive output than on the negative output can cause the negative output voltage to increase with respect to the positive output voltage. Conversely, lower impedance on the negative output than on the positive output causes the negative output voltage to decrease with respect to the positive output voltage.

Disc drive manufacturers have generally implemented dual polarity power supplies with single sided regulation in applications where the respective loads do not vary a significant amount over time, and have resorted to the more expensive and complex dual sided regulation power supplies for applications involving relatively large amounts of load variance.

There is a need, therefore, for improvements in the art to enable a dual polarity power supply with single polarity regulation to provide adequately maintained positive and negative output voltages for loads that undergo significant impedance changes over time.

SUMMARY OF THE INVENTION

In accordance with preferred embodiments, a load balancing circuit is provided to balance the output voltages of a dual polarity power supply with single polarity regulation. The power supply outputs a positive voltage at a positive voltage with respect to a reference level and a negative voltage with respect to the reference level. The power supply further applies voltage regulation to a selected one of the positive and negative voltages and leaves the remaining one of the positive and negative voltages in an unregulated state. The remaining, unregulated voltage relies on the regulation of the regulated voltage to maintain the unregulated voltage at a desired nominal level.

Positive and negative loads are coupled to receive the positive and negative voltages. Preferably, the positive and negative loads compose a microactuator in a disc drive which provides fine positioning of a read/write head with respect to a disc recording surface.

The load balancing circuit detects a change in impedance of a selected one of the positive and negative loads and which applies a corresponding impedance to the power supply. This additional impedance serves to balance the loads sensed at the output terminals of the power supply, thereby maintaining the power supply in a nominally balanced operational state. Preferably, the load balancing circuit comprises a summing and comparing network which generates an adjustment signal in relation to a difference between the reference level and a sum of the positive voltage and a negative voltage, and an impedance network which applies the corresponding impedance in relation to the adjustment signal.

These and various other features and advantages which characterize the claimed invention will be apparent from a reading of the following detailed description and a review of the associated drawings.

BRIEF DESCRIPTION OF THE DRAWINGS

FIG. 1 is a top plan view of a disc drive constructed in accordance with preferred embodiments of the present invention.

FIG. 2 is a functional block diagram of a load balancing circuit constructed and operated in accordance with preferred embodiments of the present invention to balance positive and negative output voltages supplied by a dual polarity power supply with single sided regulation to respective positive and negative loads of the disc drive of FIG. 1.

DETAILED DESCRIPTION

Figure 3:
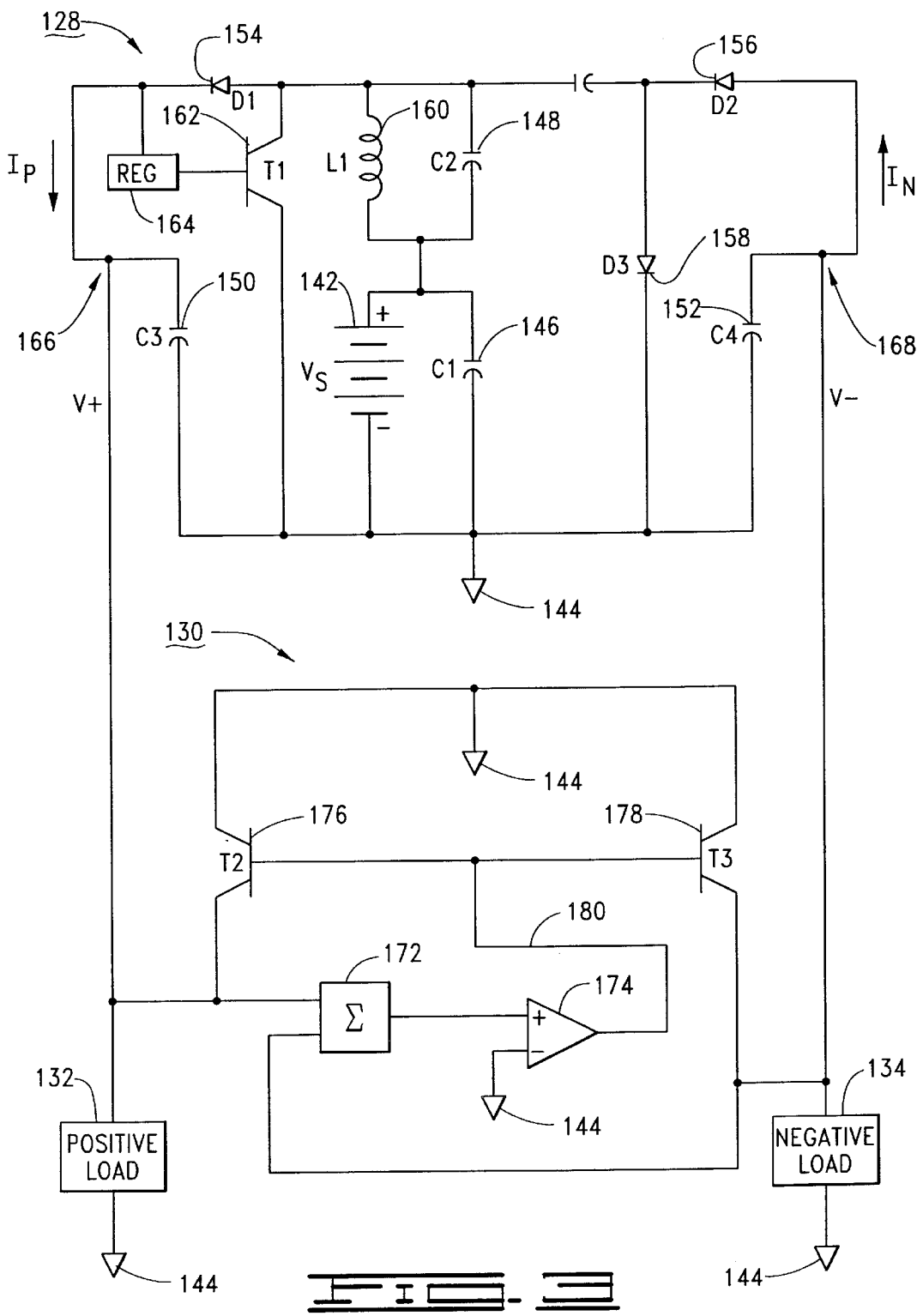
FIG. 3 is a schematic diagram illustrating the load balancing circuit of FIG. 2 in accordance with a preferred embodiment.

To illustrate an exemplary environment in which the claimed invention can readily be utilized, FIG. 1 shows a top plan view of a disc drive 100 used to store and retrieve digital data.

The disc drive 100 includes a head-disc assembly (HDA) 101 and a printed wiring assembly (PWA) which is mounted to the underside of the HDA and thus is not visible in FIG. 1. The HDA 101 includes a base deck 102 which supports various mechanical components of the drive. A top cover 104 (partially cutaway) mates with the base deck 102 to form a sealed housing for the HDA 101.

A spindle motor 106 rotates a number of discs 108 in rotational direction 109. An actuator assembly 110 rotates about a cartridge bearing assembly 112 in response to the application of current to a coil 113 of a voice coil motor (VCM) 114 to provide coarse (primary) positional control of the actuator assembly.

A number of rigid actuator arms 116 extend from the actuator assembly 110, each of which supports a corresponding flexible suspension assembly 118. A corresponding number of read/write heads 120 are supported by the respective suspension assemblies 118 over the discs 108 and used to write data to and read data from the disc surfaces.

A magnetic latch assembly 122 secures the actuator assembly 110 when the disc drive is deactivated. A flex circuit assembly 124 facilitates electrical communication between the actuator assembly 110 and the disc drive PWA.

Each head 120 includes an associated microactuator 126 to provide fine (secondary) positional control of the head. Each microactuator 126 has a piezoelectric construction and expands and contracts to move the associated head 120 through application of an operational voltage over a selected operational range, such as ±40 volts.

FIG. 2 provides a functional block diagram of selected circuitry of the disc drive 100 supported on the aforementioned disc drive PWA. The circuitry of FIG. 2 includes a dual polarity power supply with single sided regulation 128, a load balancing circuit 130, and respective positive and negative loads 132, 134. The positive and negative loads 132, 134 represent the collective impedances presented by the microactuators 126 during operation, although these blocks can alternatively represent other time varying loads of the disc drive 100.

FIG. 3 provides a schematic block diagram of the block diagram of FIG. 2 in accordance with a preferred embodiment. The power supply 128 includes a voltage source 142 which supplies source voltage Vs with respect to a reference level at a reference node 144 (in this case ground), capacitors 146, 148, 150, 152 (denoted as C1, C2, C3 and C4) diodes 154, 156, 158 (denoted as D1, D2, D3), inductor 160 (denoted as L1), transistor 162 (denoted T1) and voltage regulator 164.

The power supply 128 supplies a positive voltage +V with respect to the reference level at output terminal 166 and a negative voltage −V with respect to the reference level at output terminal 168. The voltage regulator 164 operates in conjunction with the T1 transistor 162 to regulate the positive output voltage V+, although the supply 128 could alternatively be configured to regulate the negative output voltage −V. The power supply 128 has a conventional construction and operates in a generally conventional manner except as discussed below.

The load balancing circuit 130 detects a change in impedance of a selected one of the positive and negative loads 132, 134 and applies a corresponding impedance to the power supply 128 to maintain the power supply in a nominally balanced state. The load balancing circuit 130 includes a summing junction 172, a comparator 174 and transistors 176, 178 (denoted as T2, T3).

The T2 transistor 176 is connected between the positive terminal 166 and the reference node 144, and the T3 transistor 178 is connected between the negative terminal 168 and the reference node 144. The T2, T3 transistors 176, 178 each include a control input that controls the flow of current through the respective transistors. In the embodiment shown in FIG. 3, the T2, T3 transistors are shown as having bi-polar constructions each with a base, collector and emitter, and the control inputs comprise the bases of the respective transistors. The T2 transistor 176 is preferably provided with an npn construction and the T3 transistor 178 is preferably provided with a pnp construction.

Other constructions for the transistors can readily be used, however, such as field-effect transistors (FETs) each having a gate, drain and source. In such case the control inputs to such FETs would be the respective gates of the FETs.

The +V and −V voltages from output terminals 166, 168 are provided as inputs to the summing junction 172. The sum of the input voltages is transmitted to the positive input of the comparator 174. The negative input of the comparator 174 is held at the reference level. The comparator compares the sum of the +V and −V voltages with the reference level and outputs an adjustment signal on path 180 to the respective gates of the T2, T3 transistors 176, 178. The adjustment signal drives the respective T2, T3 transistor based on the polarity of the adjustment signal to establish an impedance between the respective output voltage +V and −V and the reference level.

More particularly, when the impedance of the positive load decreases significantly with respect to the impedance of the negative load, the T2 transistor 176 will become active, generating an additional impedance path between the +V voltage and the reference level. This will increase the flow of current ($I_P$) output at the +V voltage terminal 166. Contrawise, when the impedance of the negative load decreases significantly with respect to the impedance of the positive load, the T3 transistor 178 will become active, increasing the impedance sensed at the −V output voltage terminal 168 and decreasing the flow of current ($I_N$) into the −V voltage terminal 168.

Hence, the load balancing circuit 130 continuously operates to introduce controlled amounts of impedance to maintain the respective amounts of current at the terminals 166, 168 in a desired relative relation in view of changes in the positive and negative loads 132, 134. This balanced condition will be maintained irrespective of the actual impedances of the positive and negative loads 132, 134, and will enable the single regulator 164 to maintain both output voltages +V and −V at desired operational levels.

Figure 4:
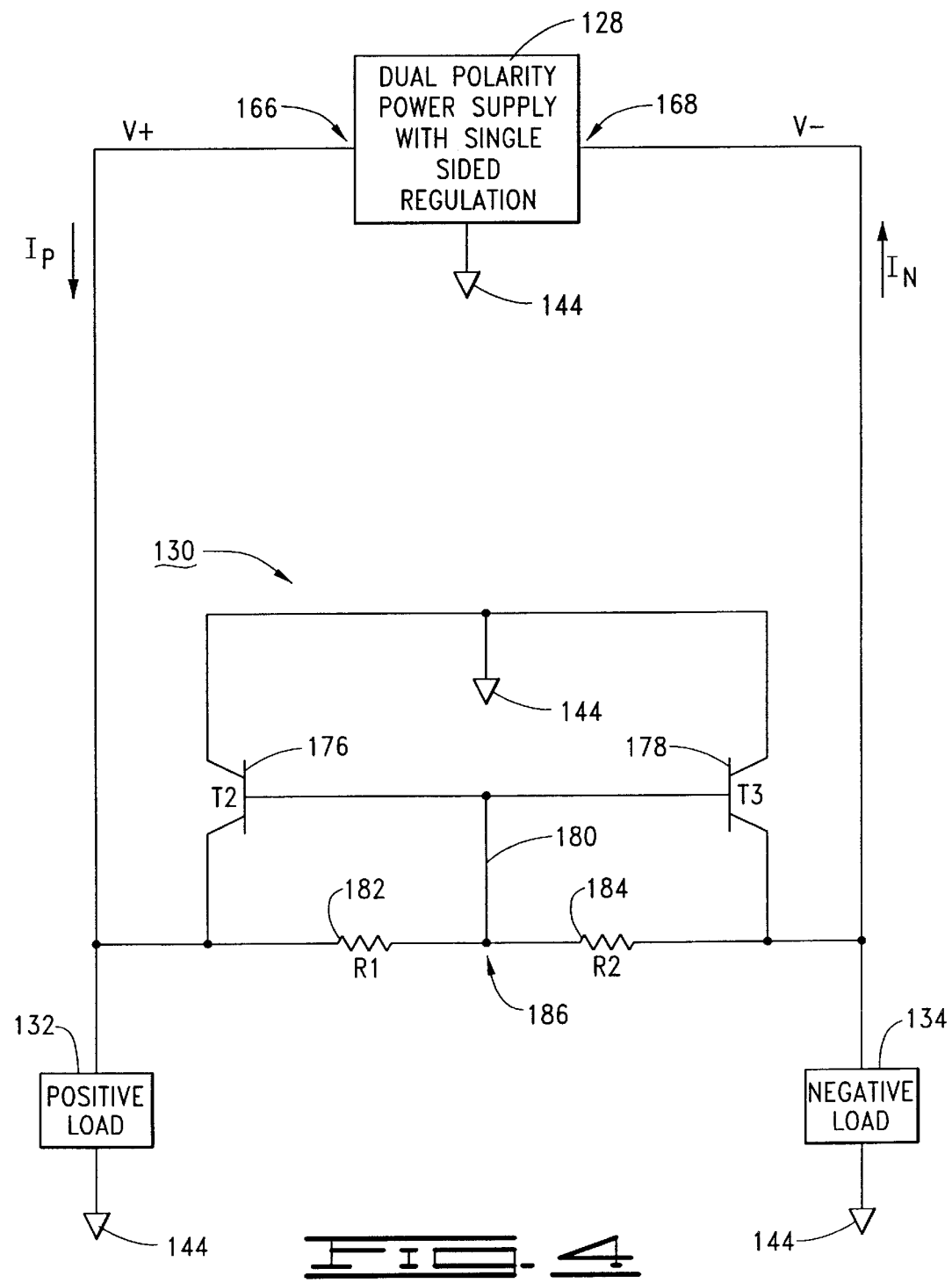
FIG. 4 is a schematic diagram illustrating the load balancing circuit of FIG. 2 in accordance with another preferred embodiment.

FIG. 4 provides a schematic diagram of the load balancing circuit 130 in accordance with an alternative embodiment.

The power supply 128 has been shown in block form in FIG. 3 for simplicity of illustration, as well as to indicate that any number of configurations of power supplies having single sided regulation can be employed. The load balancing circuit 130 includes the aforementioned T2, T3 transistors 176, 178 which are connected as shown between the +V and -V output voltages and the reference level. A voltage divider network is formed by resistors 182, 184 (denoted as R1, R2). The respective values of the R1, R2 resistors 182, 184 are selected in relation to the nominal values of the +V and -V output voltages. When the magnitudes of +V and -V are the same (i.e., ±40V), R1 is set equal to R2; when the magnitudes of +V and -V are different (i.e., +12V and -5V), the respective values of R1 and R2 are selected to provide a nominal potential equal to the reference level at intermediate summing node 186 when the voltages +V and -V are at nominal values.

As with the embodiment of FIG. 3, the embodiment of FIG. 4 compares the +V output voltage with the -V output voltage, and generates an adjustment signal on path 180 in relation to the relative difference thereof with respect to the reference level. The adjustment signal causes the appropriate T2, T3 transistor 176, 178 to become active and thereby introduce additional impedance to balance the power supply 128.

It has been demonstrated that a load balancing circuit constructed and operated as described herein to advantageously accommodate large relative changes in loading on a dual polarity power supply with single regulation. While preferred embodiments have described use of the load balancing circuit in a disc drive environment, particularly in the control of microactuators, other environments for the load balancing circuit are readily contemplated.

It will now be understood that the claimed invention is generally directed to an electrical circuit comprising a dual polarity power supply with single polarity regulation (such as 128), the power supply outputting a positive voltage at a positive terminal with respect to a reference level at a reference node and a negative voltage at a negative terminal with respect to the reference level, the power supply further applying voltage regulation to a selected one of the positive and negative voltages and leaving the remaining one of the positive and negative voltages in an unregulated state.

A positive load (such as 132) is coupled to the positive terminal to receive the positive voltage, and a negative load (such as 134) is coupled to the negative terminal to receive the negative voltage. A load balancing circuit (such as 130) is coupled to the positive and negative terminals to detect a change in impedance of a selected one of the positive and negative loads and apply a corresponding impedance to the power supply to maintain the power supply in a nominally balanced state.

Preferably, the load balancing circuit comprises a summing and comparing network (such as 172, 174, FIG. 3; 182, 184, 186, FIG. 4) which generates an adjustment signal in relation to a difference between the reference level and a sum of the positive voltage and a negative voltage, and an impedance network (such as 176, 178) which applies the corresponding impedance in relation to the adjustment signal.

It is to be understood that even though numerous characteristics and advantages of various embodiments of the present invention have been set forth in the foregoing description, together with details of the structure and function thereof, this disclosure is illustrative only and changes may be made in detail, especially in matters of structure and arrangement of parts within the principles of the invention to the full extent indicated by the broad general meaning of the terms in which the appended claims are expressed.

For example, the particular elements may vary depending upon the particular application which maintaining substantially the same functionality without departing from the scope and spirit of the invention. In addition, although preferred embodiments described herein are directed to an electrical circuit in the environment of a disc drive, it will be appreciated by those skilled in the art that the teachings of the present disclosure can readily be applied to other systems without departing from the scope and spirit of the invention.

What is claimed is:

1. An electrical circuit, comprising:
   a dual polarity power supply with single polarity regulation outputting a positive voltage from a positive terminal to a positive load and a negative voltage from a negative terminal to a negative load; and
   a load balancing circuit, coupled to the positive and negative terminals, which detects a change in impedance of a selected one of the positive and negative loads and which applies a corresponding impedance to the power supply to maintain the power supply in a nominally balanced state, based on the detected change in impedance.

2. The electrical circuit of claim 1, wherein the load balancing circuit comprises:
   a summing and comparing network which generates an adjustment signal in relation to a difference between the reference level and a sum of the positive voltage and a negative voltage; and
   an impedance network which applies the corresponding impedance in relation to the adjustment signal.

3. The electrical circuit of claim 2, wherein the summing and comparing network comprises:
   a summing junction which receives the positive voltage and the negative voltage and generates the sum of the positive voltage and the negative voltage therefrom; and
   a comparator which compares the sum of the positive voltage and the negative voltage to the reference level to generate the adjustment signal.

4. The electrical circuit of claim 2, wherein the summing and comparing network comprises:
   a summing node;
   a first resistor connected in series between the positive voltage and the summing node; and
   a second resistor connected in series between the negative voltage and the summing node, wherein the first and second resistors form a voltage divider network so that the voltage at the summing node is nominally set to the reference level.

5. The electrical circuit of claim 2, wherein the impedance network comprises:
   a first transistor connected between the positive terminal and the reference node and having a control input which controls the flow of current through the transistor; and
   a second transistor connected between the negative terminal and the reference node and having a control input which controls the flow of current through the transistor, wherein the respective control inputs of the first and second transistors are configured to receive the adjustment signal from the summing and comparing network.

6. The electrical circuit of claim 1, wherein the positive and negative loads comprise microactuators which provide fine positioning of read/write heads adjacent corresponding disc surfaces in a disc drive.

7. An electrical circuit, comprising:
- a dual polarity power supply with single polarity regulation outputting a positive voltage from a positive terminal to a positive load and a negative voltage from a negative terminal to a negative load; and
- means for detecting a change in impedance of a selected one of the positive and negative loads and for applying a corresponding impedance to the power supply to maintain the power supply in a nominally balanced state.

8. The electrical circuit of claim 7, wherein the means for detecting a change in impedance of a selected one of the positive and negative loads and for applying a corresponding impedance to the power supply to maintain the power supply in a nominally balanced state comprises:
- a summing and comparing network which generates an adjustment signal in relation to a difference between the reference level and a sum of the positive voltage and a negative voltage; and
- an impedance network which applies the corresponding impedance in relation to the adjustment signal.

9. The electrical circuit of claim 8, wherein the summing and comparing network comprises:
- a summing junction which receives the positive voltage and the negative voltage and generates the sum of the positive voltage and the negative voltage therefrom; and
- a comparator which compares the sum of the positive voltage and the negative voltage to the reference level to generate the adjustment signal.

10. The electrical circuit of claim 8, wherein the summing and comparing network comprises:
- a summing node;
- a first resistor connected in series between the positive voltage and the summing node; and
- a second resistor connected in series between the negative voltage and the summing node, wherein the first and second resistors form a voltage divider network so that the voltage at the summing node is nominally set to the reference level.

11. The electrical circuit of claim 8, wherein the impedance network comprises:
- a first transistor connected between the positive terminal and the reference node and having a control input which controls the flow of current through the transistor; and
- a second transistor connected between the negative terminal and the reference node and having a control input which controls the flow of current through the transistor, wherein the respective control inputs of the first and second transistors are configured to receive the adjustment signal from the summing and comparing network.

12. The electrical circuit of claim 7, wherein the positive and negative loads compose a microactuator which provides fine positioning of read/write heads adjacent corresponding disc surfaces in a disc drive.

13. A disc drive, comprising:
- a dual polarity power supply with single polarity regulation outputting a positive voltage from a positive terminal to a positive load and a negative voltage from a negative terminal to a negative load;
- a microactuator coupled to the power supply presenting the positive load to the positive terminal and the negative load to the negative terminal; and
- a load balancing circuit, coupled to the positive and negative terminals, which detects a change in impedance of a selected one of the positive and negative loads and which applies a corresponding impedance to the power supply to maintain the power supply in a nominally balanced state, based on the detected change in impedance.

14. The disc drive of claim 13, wherein the load balancing circuit comprises:
- a summing and comparing network which generates an adjustment signal in relation to a difference between the reference level and a sum of the positive voltage and a negative voltage; and
- an impedance network which applies the corresponding impedance in relation to the adjustment signal.

15. The disc drive of claim 14, wherein the summing and comparing network comprises:
- a summing junction which receives the positive voltage and the negative voltage and generates the sum of the positive voltage and the negative voltage therefrom; and
- a comparator which compares the sum of the positive voltage and the negative voltage to the reference level to generate the adjustment signal.

16. The disc drive of claim 14, wherein the summing and comparing network comprises:
- a summing node;
- a first resistor connected in series between the positive voltage and the summing node; and
- a second resistor connected in series between the negative voltage and the summing node, wherein the first and second resistors form a voltage divider network so that the voltage at the summing node is nominally set to the reference level.

17. The disc drive of claim 14, wherein the impedance network comprises:
- a first transistor connected between the positive terminal and the reference node and having a control input which controls the flow of current through the transistor; and
- a second transistor connected between the negative terminal and the reference node and having a control input which controls the flow of current through the transistor, wherein the respective control inputs of the first and second transistors are configured to receive the adjustment signal from the summing and comparing network.

* * * * *